US009672675B1

(12) United States Patent
Nishiyama et al.

(10) Patent No.: US 9,672,675 B1
(45) Date of Patent: Jun. 6, 2017

(54) LOCK-UNLOCK SYSTEM FOR VEHICLE

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/266,890

(22) Filed: Sep. 15, 2016

(30) Foreign Application Priority Data

Nov. 12, 2015 (JP) ................................ 2015-222474

(51) Int. Cl.
*G06F 7/04* (2006.01)
*G07C 9/00* (2006.01)

(52) U.S. Cl.
CPC ...... *G07C 9/00309* (2013.01); *G07C 9/00111* (2013.01); *G07C 2009/00388* (2013.01); *G07C 2209/63* (2013.01)

(58) Field of Classification Search
CPC .. G07C 9/00309; G07C 9/00007; G07C 9/00; G07C 9/00111; G07C 2209/63
USPC .............. 340/4.6–4.62, 5.1–5.25, 5.27–5.28, 340/5.3–5.31, 5.5, 5.6–5.67, 5.7–5.73
See application file for complete search history.

(56) References Cited

U.S. PATENT DOCUMENTS

2004/0259542 A1* 12/2004 Viitamaki ............... H04L 12/12 455/426.2
2008/0048846 A1* 2/2008 Nagai ..................... B60R 25/24 340/426.17
2011/0169657 A1* 7/2011 August ................ A01K 11/004 340/854.6
2012/0238205 A1* 9/2012 Reunamaki .............. H04B 5/02 455/41.1

FOREIGN PATENT DOCUMENTS

JP 2001-115699 A 4/2001
JP 2005-127050 A 5/2005
JP 2009-235668 A 10/2009

* cited by examiner

*Primary Examiner* — Carlos E Garcia
(74) *Attorney, Agent, or Firm* — Oliff PLC

(57) ABSTRACT

A lock-unlock system for a vehicle includes a mobile terminal and an in-vehicle device. The mobile terminal includes a unit to return a first response signal responding to a first request signal, and a unit to return a second response signal responding to a second request signal in response to receiving power supplied by electromagnetic induction induced by the second request signal. The in-vehicle device includes a unit to transmit the first request signal, to execute first verification control for verifying an identification code in the first response signal; a unit to transmit the second request signal, to execute second verification control for verifying an identification code in the second response signal; and a unit to indicate switching from the first verification control to the second verification control if a condition for the switching is satisfied after the first verification control has been started, to the user.

4 Claims, 5 Drawing Sheets

LOCK-UNLOCK SYSTEM FOR VEHICLE

FIELD

The present disclosure relates to a lock-unlock system for a vehicle.

BACKGROUND

Conventionally, a lock-unlock system for a vehicle has been known that includes an in-vehicle device installed on the vehicle and a mobile terminal that can be carried by the user, and executes locking or unlocking a door of the vehicle by wireless communication between the in-vehicle device and the mobile terminal (see, for example, Patent Document 1). Patent Document 1 discloses a remote unit having a transponder as an example of the mobile terminal, and a unit on the vehicle side as an example of the in-vehicle device.

According to the technology of Patent Document 1, in response to receiving an electromagnetic wave for activation that is transmitted from the unit on the vehicle side, the remote unit replies with an ID code of an RF signal (an identification code of the remote unit). On the other hand, if it has been determined that the battery of the remote unit is dead, the remote unit receives power supplied by electromagnetic induction induced by the electromagnetic wave for activation that has been transmitted from the unit on the vehicle side, and replies with an ID code for the transponder (an identification code of the remote unit). The unit on the vehicle side executes locking or unlocking the door of the vehicle, based on a result of verification of the ID code of the RF signal or the ID code for the transponder.

In this way, if a predetermined condition is satisfied, the system in Patent Document 1 automatically switches from control for verifying the identification code of the remote unit in a communication mode using the RF signal, to control for verifying the identification code of the remote unit in a communication mode using electromagnetic induction.

RELATED-ART DOCUMENTS

Patent Documents

[Patent Document 1] Japanese Laid-open Patent Publication No. 2001-115699

To verify the identification code of a mobile terminal in a communication mode using electromagnetic induction, it is necessary to have the mobile terminal approach the in-vehicle device (specifically, the antenna that induces the electromagnetic induction). However, with the conventional technology, it is difficult for the user to recognize the switching from the control for verifying the identification code of the mobile terminal, to the control for verifying the identification code of the mobile terminal in the communication mode using electromagnetic induction, and hence, it is difficult for the user to recognize a timing to have the mobile device approach the in-vehicle device.

Thereupon, it is an object of an embodiment to provide a lock-unlock system for a vehicle that makes it easy for a user to recognize a timing to have the mobile device approach the in-vehicle device.

SUMMARY

According to a first aspect, a lock-unlock system for a vehicle includes an in-vehicle device installed on the vehicle; and a mobile terminal that can be carried by a user, and executes locking or unlocking of a door of the vehicle by wireless communication between the in-vehicle device and the mobile terminal. The mobile terminal includes a first communication control unit configured to return a reply of a first response signal that includes a first identification code of the mobile terminal, in response to receiving a first request signal transmitted from an antenna of the in-vehicle device; and a second communication control unit configured to return a reply of a second response signal that includes a second identification code of the mobile terminal, in response to receiving power supplied by electromagnetic induction induced by a second request signal transmitted from an antenna of the in-vehicle device. The in-vehicle device includes a first verification control unit configured to execute first verification control for verifying the first identification code, in a first wireless communication mode that transmits the first request signal, and receives the first response signal; a second verification control unit configured to execute second verification control for verifying the second identification code, in a second wireless communication mode having a shorter reachable communication range than the first wireless communication mode, that transmits the second request signal, and receives the second response signal; a lock-unlock control unit configured to execute locking or unlocking the door, based on a result of the verifying by the first verification control or the second verification control; a command unit configured to issue a command for switching from the first verification control to the second verification control, in a case where a condition for switching from the first verification control to the second verification control is satisfied after the first verification control has been started; and an indication unit configured to indicate the switching to the user carrying the mobile terminal.

According to the first aspect, in a case where a condition for switching from the first verification control to the second verification control is satisfied after the first verification control has been started, the indication unit can indicate the switching to the user carrying the mobile terminal. The second response signal is a signal that is returned as a reply by electromagnetic induction induced by the second request signal, and the second verification control is an example of control for verifying an identification code of the mobile terminal in a communication mode using electromagnetic induction. Therefore, even when control for verifying the identification code of the mobile terminal is automatically switched to the second verification control that verifies the identification code of the mobile terminal in the communication mode using electromagnetic induction, the user can recognize the switching by an indication by the indication unit. Consequently, it is easy for the user to recognize a timing to have the mobile device approach the in-vehicle device.

According to a second aspect, the indication unit includes an illumination unit configured to indicate switching from the first verification control to the second verification control, by change of light, and an illumination control unit configured to control the change of the light.

According to the second aspect, even if the vehicle is stopped at a comparatively dark place, the user around the vehicle can visually recognize switching from the first verification control to the second verification control, and hence, it is easy for the user to recognize a timing to have the mobile device approach the in-vehicle device.

According to a third aspect, the illumination control unit has the illumination unit emit light in a first light emission aspect while the first verification control is being executed, and has the illumination unit emit light in a second light emission aspect, which is different from the first light emission aspect, while the second verification control is being executed.

According to the third aspect, the user carrying the mobile device can recognize that the first verification control is being executed by the first light emission aspect, and can recognize that the second verification control is being executed by the second light emission aspect. Further, by the change of the illumination unit from the first light emission aspect to the second light emission aspect, the user carrying the mobile device can visually recognize the switching from the first verification control to the second verification control. Therefore, it is easy for the user to recognize a timing to have the mobile device approach the in-vehicle device.

According to a fourth aspect, the illumination control unit has the illumination unit turn off light while the first verification control is being executed, and has the illumination unit turn on light while the second verification control is being executed.

According to the fourth aspect, by having the illumination unit change from a light-turned-off state to a light-turned-on state, the user carrying the mobile device can visually recognize the switching from the first verification control to the second verification control. Therefore, it is easy for the user to recognize a timing to have the mobile device approach the in-vehicle device.

According to an embodiment, it is possible to make it easy for the user to recognize a timing to have the mobile device approach the in-vehicle device.

DESCRIPTION OF EMBODIMENTS

In the following, embodiments will be described with reference to the drawings.

Figure 1:
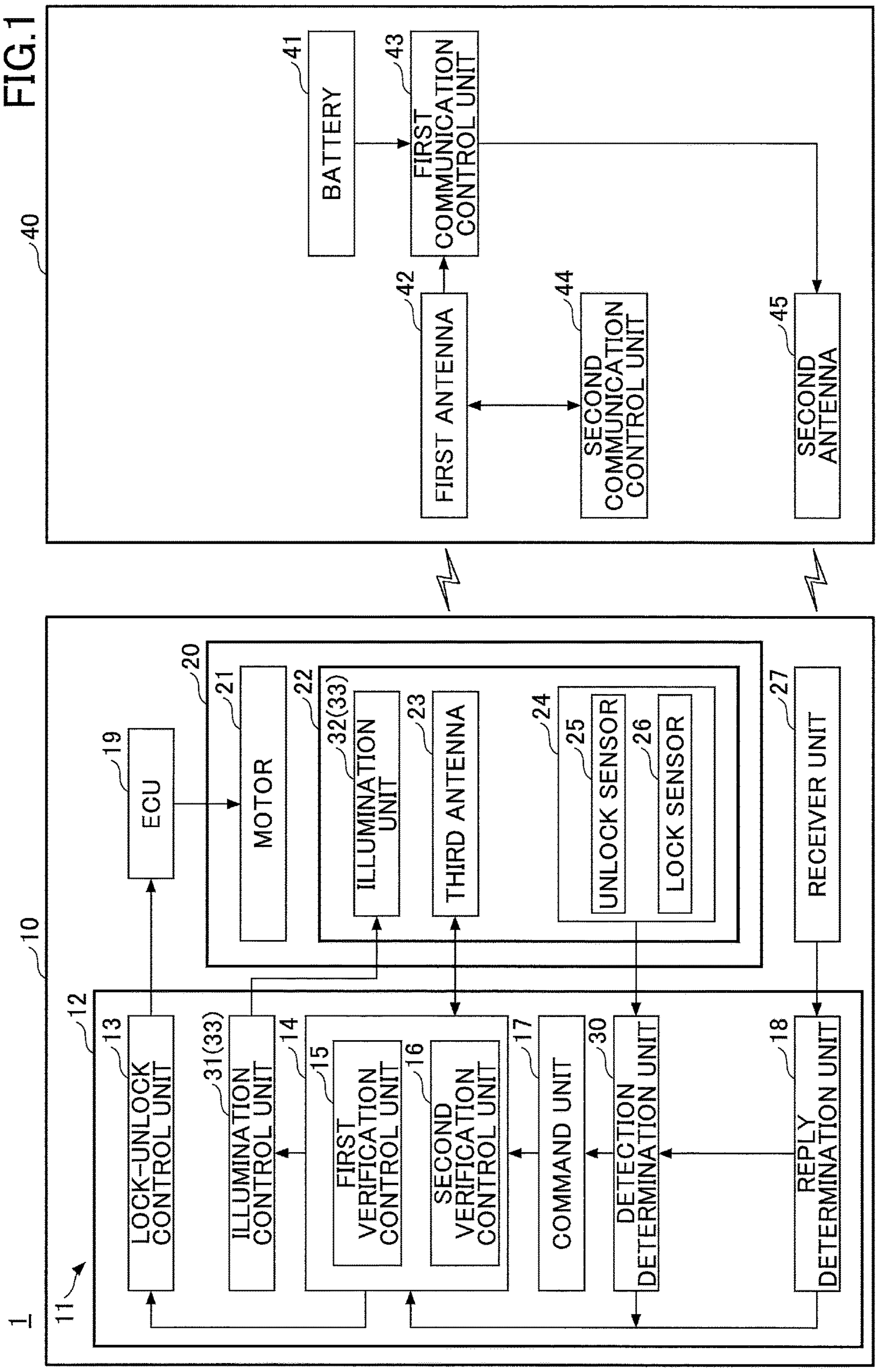
FIG. 1 is a diagram illustrating an example of a configuration of a lock-unlock system for a vehicle.

FIG. 1 is a diagram illustrating an example of a configuration of a lock-unlock system for a vehicle 1. The lock-unlock system for a vehicle 1 is an example of a system that includes an in-vehicle device 11 and a mobile device 40, and executes locking or unlocking a door 20 of a vehicle 10 by wireless communication between the in-vehicle device 11 and the mobile device 40. The in-vehicle device 11 is installed on the vehicle 10, and constituted with one or multiple parts. The mobile device 40 is a device that can be carried by a user.

The mobile device 40 includes a battery 41, a first antenna 42, a second antenna 45, a first communication control unit 43, and a second communication control unit 44.

The battery 41 is the power source of the first communication control unit 43, and the first communication control unit 43 does not function without the power supplied from the battery 41.

The first antenna 42 is an antenna that can transmit and receive a signal by a radio wave in an LF band, to and from a third antenna 23 of the in-vehicle device 11. Here, "LF" stands for "Low Frequency". The first antenna 42 receives a first request signal transmitted from the third antenna 23 of the in-vehicle device 11 (referred to as the "first request signal Rq1", below), and outputs the received first request signal Rq1 to the first communication control unit 43. Also, the first antenna 42 receives a second request signal transmitted from the third antenna 23 of the in-vehicle device 11 (referred to as the "second request signal Rq2", below), and outputs the received second request signal Rq2 to the second communication control unit 44.

The second antenna 45 is an antenna dedicated for transmission than can transmit a first response signal responding to the first request signal Rq1 (referred to as the "first response signal Rs1", below) by a radio wave (an RF signal) in a UHF band to the receiver unit 27 of the in-vehicle device 11. Here, "UHF" stands for "Ultra High Frequency", and "RF" stands for "Radio Frequency".

In response to receiving the first request signal Rq1 transmitted from the in-vehicle device 11 via the first antenna 42, the first communication control unit 43 replies with the first response signal Rs1 that includes a first identification code of the mobile device 40 via the second antenna 45. When the battery 41 is becoming dead, the power supply voltage supplied to the first communication control unit 43 drops extremely, and consequently, the first communication control unit 43 becomes incapable of transmitting a reply of the first response signal Rs1.

Upon receiving power supplied by electromagnetic induction induced by the second request signal Rq2 transmitted from the in-vehicle device 11 via the first antenna 42, the second communication control unit 44 replies with a second response signal that includes a second identification code of the mobile device 40 (referred to as the "second response signal Rs2", below) via the first antenna 42. Even if the battery 41 has become dead, the second communication control unit 44 can return a reply of the second response signal Rs2 by the power supplied by electromagnetic induction induced on the first antenna 42 by the second request signal Rq2.

The second communication control unit 44 is, for example, a transponder that has the second identification code, and is used by an immobilizer device on the side of the vehicle 10 (for example, a lock-unlock control device 12 having an immobilizer function), for determining whether to permit the vehicle 10 traveling (for example, whether to permit the engine starting).

In the following, the first identification code of the mobile device 40 included in the first response signal Rs1 will be referred to as the "identification code Cm1", and the second identification code of the mobile device 40 included in the second response signal Rs2 will be referred to as the "identification code Cm2". The identification code Cm1 and the identification code Cm2 may be the same code data, or may be code data different from each other, as long as the mobile device 40 can be identified on the side of the in-vehicle device 11.

On the other hand, the in-vehicle device 11 includes an operation detection unit 24, the third antenna 23, a receiver unit 27, the lock-unlock control device 12, and an ECU 19. The in-vehicle device 11 further includes an indication unit 33. The indication unit 33 includes, for example, an illumination unit 32 and an illumination control unit 31.

The operation detection unit 24 and the third antenna 23 are disposed, for example, on an outside door handle 22 of the door 20. The outside door handle 22 is a contact operation unit on which the user performs a contact operation (for example, gripping, pressing, or the like) for unlocking or locking the door 20 from the outside of the vehicle 10.

The operation detection unit 24 detects an operation for unlocking or locking the door 20 by the user around the door 20 of the vehicle 10. In the following, an operation for unlocking or locking the door 20 by the user around the door 20 of the vehicle 10 may be simply referred to as a "user operation". The operation detection unit 24 may detect, for example, a contact operation on the outside door handle 22 as a user operation, or may detect an operation on a button disposed on the door 20 as a user operation. Also, the operation detection unit 24 may detect a user operation, based on a result of imaging by a camera, a result of receiving a reflected radio wave that has been radiated, or the like.

The operation detection unit 24 includes, for example, an unlock sensor 25, and a lock sensor 26. The unlock sensor 25 detects an operation for unlocking the door 20 (an unlocking operation), and the lock sensor 26 detects an operation for locking the door 20 (a locking operation). Alternatively, the operation detection unit 24 may detect a user operation detected in a locked state of the door 20 as an unlocking operation, and may detect a user operation detected in an unlocked state of the door 20 as a locking operation.

The third antenna 23 is an antenna that transmits a first request signal Rq1 by a radio wave in an LF band. The third antenna 23 is also an antenna to transmit a second request signal Rq2 by a radio wave in an LF band, for inducing electromagnetic induction on the first antenna 42 that forms electromagnetic coupling with the third antenna 23.

Figure 2:
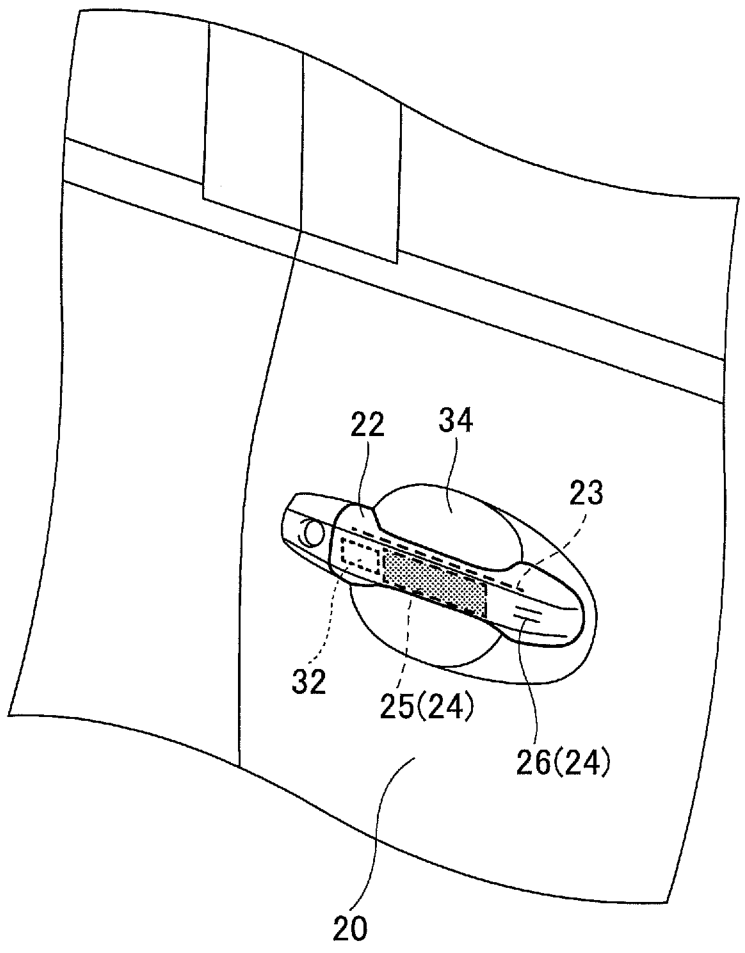
FIG. 2 is a diagram of an example of a part of a door viewed from the outside of a vehicle.

FIG. 2 is a diagram of an example of a part of the door 20 of the vehicle 10 viewed from the outside of the vehicle 10. The operation detection unit 24 and the third antenna 23 are provided on the outside door handle 22 of the door 20, for example, as illustrated in FIG. 2. The operation detection unit 24 includes the unlock sensor 25 and the lock sensor 26.

The illumination unit 32 emits light so that the user standing by the door 20 can visually recognize the light. The illumination unit 32 includes, for example, a light source and a lens. As a specific example of the light source, a light-emitting diode may be considered. As specific examples of the lens, a lens that transmits light from the light source to illuminate a work space 34, a lens that transmits light from the light source to illuminate feet of the user standing by the door 20, and the like may be considered. The work space 34 is a concave portion on the outer surface of the door 20 that makes it easy for the user to grip the outside door handle 22.

In FIG. 1, the receiver unit 27 receives a first response signal Rs1, and outputs a result of the reception to the lock-unlock control device 12. The receiver unit 27 outputs the identification code Cm1 included in the first response signal Rs1. The receiver unit 27 is a receiver circuit such as a tuner that receives a radio wave, for example, in an UHF band.

The lock-unlock control device 12 includes a verification unit 14, a lock-unlock control unit 13, a reply determination unit 18, a detection determination unit 30, a command unit 17, and the illumination control unit 31. The lock-unlock control device 12 is, for example, an electronic control unit (ECU) that includes a microcomputer to implement the verification unit 14, the lock-unlock control unit 13, the reply determination unit 18, the detection determination unit 30, the command unit 17, and the illumination control unit 31. The verification unit 14 includes a first verification unit 15 and a second verification unit 16.

The first verification unit 15 executes first verification control for transmitting a first request signal Rq1 by the third antenna 23, and receiving a first response signal Rs1 by the receiver unit 27 in a first wireless communication mode, and verifying the identification code Cm1 included in the first response signal Rs1. The first request signal Rq1 is a signal requesting a reply of the identification code Cm1. The first verification unit 15 executes the first verification control, for example, by verifying the identification code Cm1 with a predetermined registration code Cr1 registered in advance on the side of the vehicle 10 as a valid code of the in-vehicle device 11, and outputs a result of the verification to the lock-unlock control unit 13.

The second verification unit 16 executes second verification control for transmitting a second request signal Rq2 by the third antenna 23, and receiving a second response signal Rs2 by the third antenna 23 in a second wireless communication mode, and verifying the identification code Cm2 included in the second response signal Rs2. The second request signal Rq2 is a signal requesting a reply of the identification code Cm2. The second verification unit 16 executes the second verification control, for example, by verifying the identification code Cm2 with a predetermined registration code Cr2 registered in advance on the side of the vehicle 10 as a valid code of the in-vehicle device 11, and outputs a result of the verification to the lock-unlock control unit 13.

The second wireless communication mode uses communication by electromagnetic induction between the third antenna 23 and the first antenna 42, and hence, has a reachable communication range shorter than that of the first wireless communication mode. Also, when communicating in the first wireless communication mode, communication between the first verification unit 15 and the third antenna 23 is unidirectional communication, and when communicating in the second wireless communication mode, communication between the second verification unit 16 and the third antenna 23 is bidirectional communication.

The lock-unlock control unit 13 executes locking or unlocking of the door 20, based on a result of verification of the first verification control by the first verification unit 15, or a result of verification of the second verification control by the second verification unit 16. The lock-unlock control unit 13 outputs an unlock request signal or a lock request signal of the door 20 to the ECU 19, for example, if the identification code Cm1 is equivalent to the registration code Cr1, or the identification code Cm2 is equivalent to the registration code Cr2. The ECU 19 actuates a motor 21 in a direction to switch the door 20 from a locked state to an unlocked state in response to an unlock request signal, or actuates the motor 21 in a direction to switch the door 20 from an unlocked state to a locked state in response to a lock request signal.

The command unit 17 is an example of a unit to issue a command for switching from the first verification control to the second verification control, if a condition for switching from the first verification control to the second verification control is satisfied after the first verification control has been started.

The indication unit 33 is an example of a unit to indicate switching from the first verification control to the second verification control, to the user carrying the mobile device 40 around the vehicle 10. The indication unit 33 includes, for example, the illumination unit 32 and the illumination control unit 31. The illumination unit 32 is an example of a unit to indicate switching from the first verification control to the second verification control, by change of light. The illumination control unit 31 is an example of a unit to control emitting light from the illumination unit 32, and controls change of light emitted from the illumination unit 32. The illumination control unit 31 includes, for example, a drive circuit to output a drive signal that makes the illumination unit 32 emit light.

The reply determination unit 18 determines whether a reply of the first response signal Rs1 comes after transmission of the first request signal Rq1. For example, the reply determination unit 18 determines that a reply of the first response signal Rs1 has come if a first response signal Rs1 has been detected as received by the receiver unit 27. On the other hand, the reply determination unit 18 determines that a reply of the first response signal Rs1 has not come if a first response signal Rs1 has not been detected as received by the receiver unit 27.

If no reply of the first response signal Rs1 has been determined by the reply determination unit 18, the detection determination unit 30 determines whether detection of a user operation continues on the operation detection unit 24. The command unit 17 issues a command to the verification unit 14 following a result of the determination by the detection determination unit 30.

Figure 3:
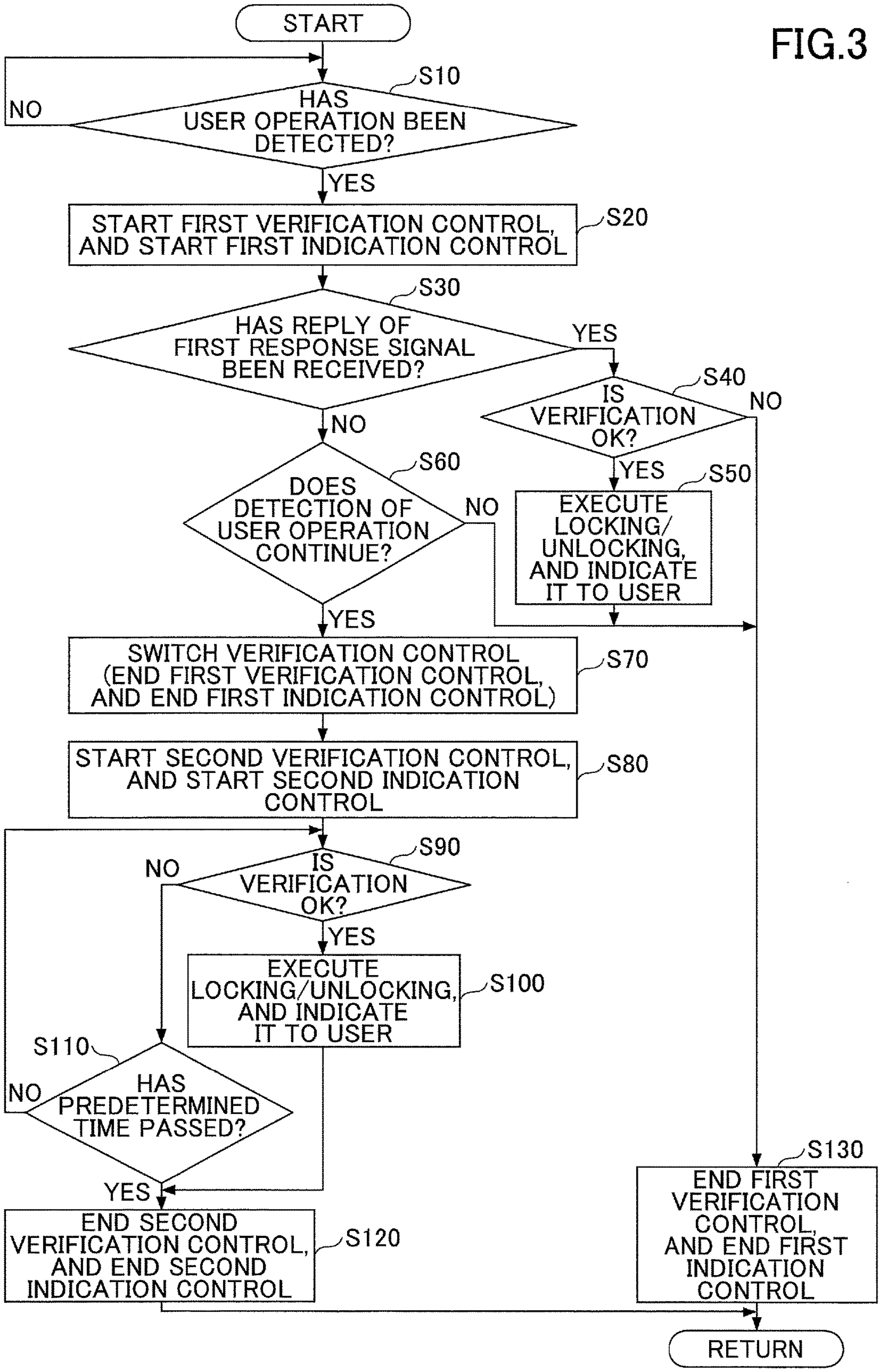
FIG. 3 is a flowchart illustrating an example of operations of an in-vehicle device.
Figure 4:
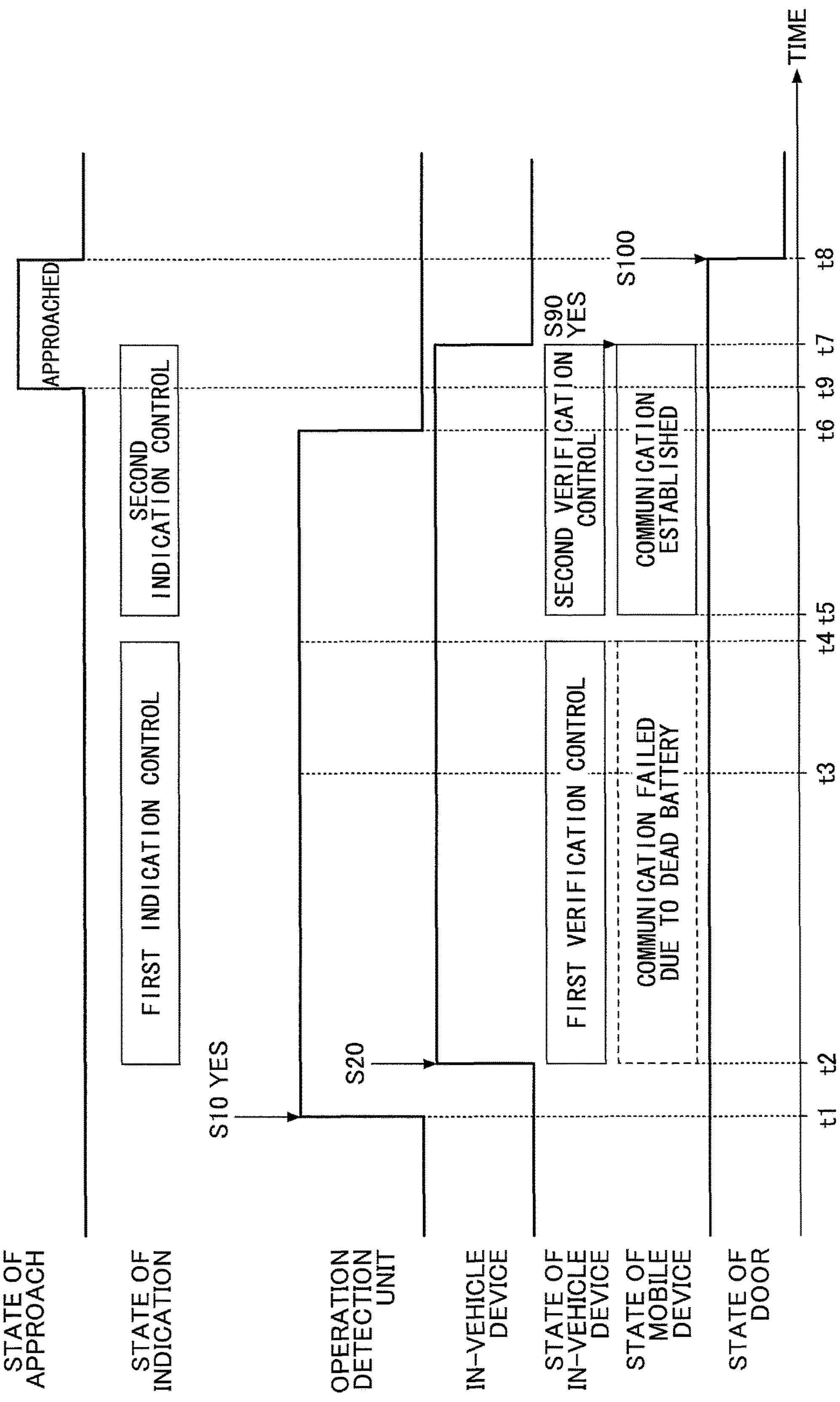
FIG. 4 is a timing chart illustrating an example of operations of a lock-unlock system for a vehicle.

FIG. 3 is a flowchart illustrating an example of operations of the lock-unlock control device 12 of the in-vehicle device 11. FIG. 4 is a timing chart illustrating an example of operations of the lock-unlock system for a vehicle 1. Next, steps in the FIG. 3 will be described with reference to FIG. 4. FIG. 4 illustrates an example of a case where the command unit 17 has determined that a predetermined condition is satisfied for switching from the first verification control to the second verification control after having started the first verification control, and issues a command for switching from the first verification control to the second verification control.

At Step S10, the detection determination unit 30 determines whether an unlocking operation or a lock operation by the user (namely, a user operation) has been detected by the operation detection unit 24. The operation detection unit 24 outputs, for example, a low-level signal if a user operation has not been detected, or outputs a high-level signal if a user operation has been detected.

If it has been determined by the detection determination unit 30 that a user operation has not been detected by the operation detection unit 24, the first verification unit 15 does not start the first verification control. On the other hand, if it has been determined by the detection determination unit 30 that a user operation has been detected by the operation detection unit 24, for example, at timing t1, the first verification unit 15 starts the first verification control, for example, at timing t2 (Step S20).

If a user operation has been detected by the operation detection unit 24, it can be estimated that likelihood of the user being around the vehicle 10 is high. Therefore, by starting the first verification control when a user operation has been detected by the operation detection unit 24, transmission of the first request signal Rq1 can be started when the likelihood of the user being around the vehicle 10 is high. In other words, if the likelihood of the user being around the vehicle 10 is low, the first request signal Rq1 is not transmitted, and hence, power consumption of the in-vehicle device 11 can be prevented from increasing.

Also, if the first verification unit 15 has started the first verification control, the illumination control unit 31 starts first indication control, for example, at timing t2, for having the illumination unit 32 emit light in a predetermined first light emission aspect (for example, in blue color) while the first verification control is being executed (Step S20). Thus, the user around the vehicle 10 can visually recognize that the first verification control has been started.

At Step S30, the reply determination unit 18 determines whether a reply of a first response signal Rs1 has come after the transmission of the first request signal Rq1 has been started. If it has been determined by the reply determination unit 18 that the reply of the first response signal Rs1 has come, for example, at timing t3, the first verification unit 15 determines whether the identification code Cm1 included in the first response signal Rs1 is equivalent to the predetermined registration code Cr1 (Step S40).

If the verification by the first verification unit 15 results in the equivalence (if the verification succeeded), the lock-unlock control unit 13 outputs a lock request signal or an unlock request signal to the ECU 19, to execute locking or unlocking the door 20 (Step S50). At this moment, the lock-unlock control unit 13 blinks hazard lamps, or sounds a buzzer to indicate to the user that the door 20 has been locked or unlocked. After Step S50, the first verification unit 15 ends the first verification control, and upon detecting the end of the first verification control, the illumination control unit 31 ends the first indication control (Step S130). The end of the first indication control has the illumination unit 32 turn off the light.

On the other hand, if the verification by the first verification unit 15 does not result in the equivalence (if the verification failed), the lock-unlock control unit 13 does not execute locking or unlocking the door 20, the first verification unit 15 ends the first verification control, and upon detecting the end of the first verification control, the illumination control unit 31 ends the first indication control (Step S130). In this case, the end of the first indication control has the illumination unit 32 turn off the light.

Also, Step S30, if a reply of the first response signal Rs1 has not come even if transmission of the first request signal Rq1 has been retried, the reply determination unit 18 transfers that the reply of the first response signal Rs1 has not come, to the detection determination unit 30.

At Step S60, the detection determination unit 30 determines whether a user operation is continuously detected by the operation detection unit 24. The detection determination unit 30 determines that a user operation is continuously detected by the operation detection unit 24 if the user operation has been detected by the operation detection unit 24, for example, at timing t1, and then, detected by the operation detection unit 24 again, for example, at timing t4. On the other hand, the detection determination unit 30 determines that a user operation is not continuously detected by the operation detection unit 24 if the user operation has been detected by the operation detection unit 24, for example, at timing t1, but then, not detected by the operation detection unit 24 again, for example, at timing t4.

If no reply of the first response signal Rs1 has been determined by the reply determination unit 18, and it has been determined by the detection determination unit 30 that the user operation is not continuously detected by the operation detection unit 24, the command unit 17 issues a command to end the first verification control to the first verification unit 15 (Step S130). Upon detecting the end of the first verification control the illumination control unit 31 ends the first indication control (Step S130).

If no reply of the first response signal Rs1 has been determined, and it has been determined that the user operation is not continuously detected by the operation detection unit 24, it is highly likely that detection of the user operation at the timing t1 has been an erroneous detection, and it can be estimated that the likelihood of the user being around the vehicle 10 is low. Thereupon, if no reply of the first response signal Rs1 has been determined, and it has been determined that the user operation is not continuously detected by the operation detection unit 24, the first verification control and first indication control end. Thus, if the likelihood of the user being around the vehicle 10 is low, transmission of the first request signal Rq1 and light emission of the illumination unit 32 are stopped, and hence, power consumption of the in-vehicle device 11 can be prevented from increasing.

On the other hand, if no reply of the first response signal Rs1 has been determined by the reply determination unit 18, and it has been determined by the detection determination unit 30 that the user operation is continuously detected by the operation detection unit 24, the command unit 17 issues a command to end the first verification control to the first verification unit 15, and switches from the first verification control to the second verification control (Step S70). Then, the command unit 17 issues a command to start the second verification control to the second verification unit 16, for example, at timing t5 (Step S80).

On the other hand, if no reply of the first response signal Rs1 has been determined by the reply determination unit 18, and it has been determined by the detection determination unit 30 that the user operation is continuously detected by the operation detection unit 24, the illumination control unit 31 ends the first indication control upon detecting the end of the first verification control, and switches from the first indication control to second indication control (Step S70). Then, if the second verification unit 16 has started the second verification control, the illumination control unit 31 starts the second indication control, for example, at timing t5, for having the illumination unit 32 emit light in a predetermined second light emission aspect (for example, in red color), which is different from the first light emission aspect, while the second verification control is being executed (Step S80).

When the second indication control starts, the user around the vehicle 10 can visually recognize the switching from the first verification control to the second verification control. Therefore, it is easy for the user to recognize a timing to have the mobile device 40 approach the outside door handle 22 having the third antenna 23 installed. In the example in FIG. 4, the user has the mobile device 40 approach the outside door handle 22 at timing t9.

If no reply of the first response signal Rs1 has been determined, and it has been determined that the user operation is continuously detected by the operation detection unit 24, it can be estimated that the likelihood of the user being around the vehicle 10 is high. Thereupon, if no reply of the first response signal Rs1 has been determined, and it has been determined that the user operation is continuously detected by the operation detection unit 24, the first verification control and the first indication control end, and the second verification control and the second indication control start. Thus, if the likelihood of the user being around the vehicle 10 is high, transmission of the second request signal Rq2 and light emission of the illumination unit 32 in the second light emission aspect are started. In other words, if the likelihood of the user being around the vehicle 10 is low, the second request signal Rq2 is not transmitted, and hence, power consumption of the in-vehicle device 11 can be prevented from increasing.

At Step S90, the second verification unit 16 determines whether the identification code Cm2 included in the second response signal Rs2 is equivalent to the predetermined registration code Cr2. If the verification at Step 90 results in the equivalence, it can be estimated that the reason why no reply of the first response signal Rs1 has come at Step S30 is that the battery 41 of the mobile device 40 is dead. Note that the user operation may be shifted from a detected state to a non-detected state before the verification at Step S90 (for example, at timing t6).

If the verification by the second verification unit 16 results in the equivalence (if the verification succeeded), for example, at timing t7, the lock-unlock control unit 13 outputs a lock request signal or an unlock request signal to the ECU 19, to execute locking or unlocking the door 20, for example, at timing t8 (Step S100). At this moment, the lock-unlock control unit 13 blinks hazard lamps, or sounds a buzzer to indicate to the user that the door 20 has been locked or unlocked. After Step S100, the second verification unit 16 ends the second verification control, and upon detecting the end of the second verification control, the illumination control unit 31 ends the second indication control (Step S120). The end of the second indication control has the illumination unit 32 turn off the light.

On the other hand, if the verification at Step 90 does not result in the equivalence (if the verification failed), the second verification unit 16 determines whether a predetermined time (for example, 10 seconds) has passed since the start of the second verification control (Step S110). If the predetermined time has not passed, the second verification unit 16 repeats the verification at Step S90. If the equivalence is not obtained by the verification at Step S90 until the predetermined time passes after the second verification control has been started, the second verification unit 16 ends the second verification control (Step S120). Upon detecting the end of the second verification control, the illumination control unit 31 ends the second indication control (Step S120).

If the equivalence is not obtained by the verification at Step S90 until the predetermined time passes after the second verification control has been started, it can be estimated that the user does not carry the mobile device 40, or the user carries a mobile device 40 that is not valid, Thereupon, if the equivalence is not obtained by the verification at Step S90 until the predetermined time passes after the second verification control has been started, the second verification control and the second communication control end. Thus, if the user does not carry the mobile device 40, or the user carries a mobile device 40 that is not valid, transmission of the second request signal Rq2 stops. If the user does not carry the mobile device 40, or the user carries a mobile device 40 that is not valid, transmission of the second request signal Rq2 and light emission of the illumination unit 32 in the second light emission aspect are stopped, and hence, power consumption of the in-vehicle device 11 can be prevented from increasing.

Figure 5:
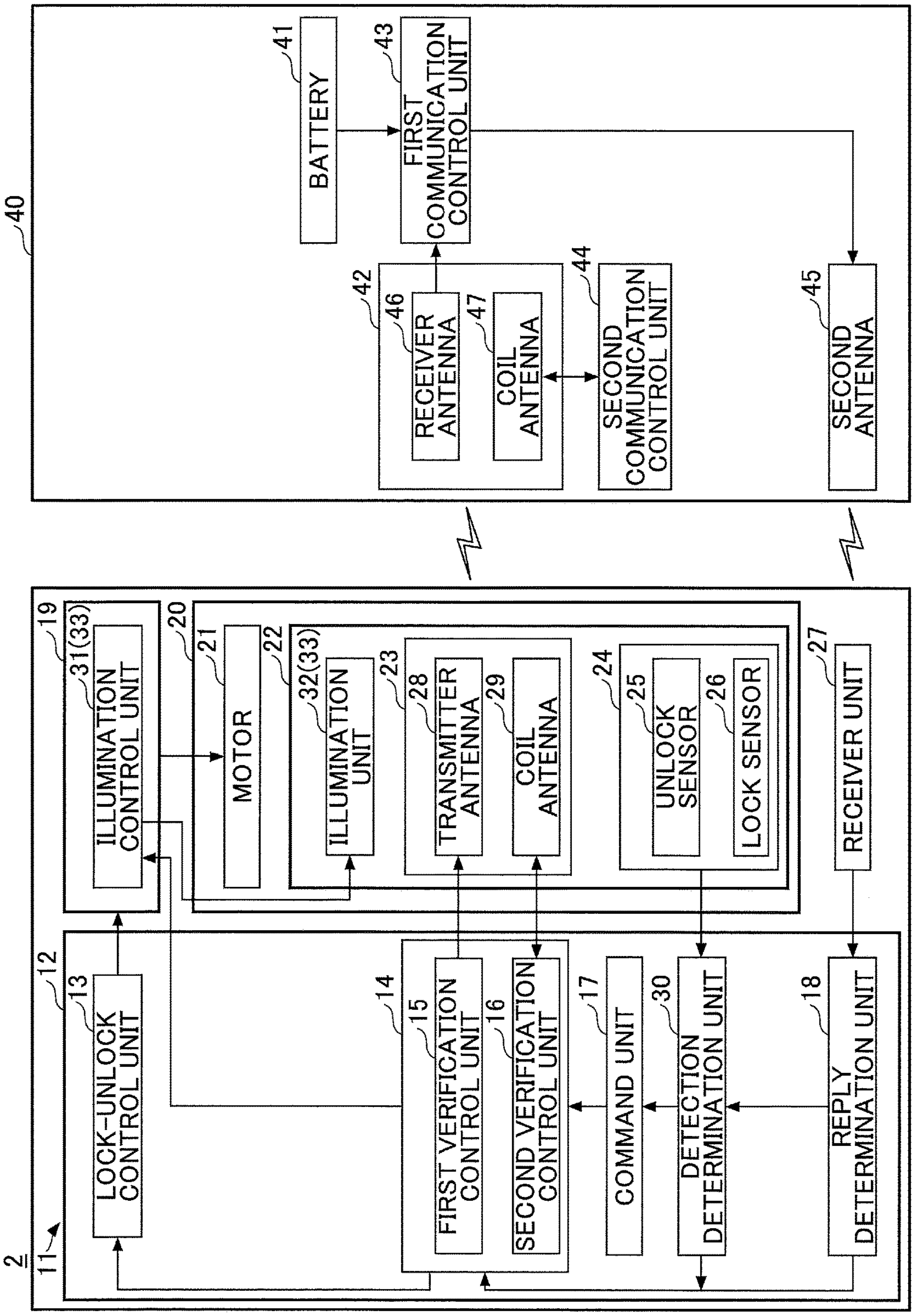
FIG. 5 is a diagram illustrating an example of a configuration of a lock-unlock system for a vehicle.

FIG. 5 is a diagram illustrating an example of a configuration of a lock-unlock system for a vehicle 2. For the same elements and effects as in FIG. 1, see the above description.

The lock-unlock system for a vehicle 1 in FIG. 1 has the illumination control unit 31 included in the lock-unlock control device 12. On the other hand, the lock-unlock system for a vehicle 2 in FIG. 5 has the illumination control unit 31 included in the ECU 19. Note that the illumination control unit 31 may be disposed at a different place on the vehicle 10, for example, a location on the door 20 other than the outside door handle 22, or on the outside door handle 22.

Also, in the lock-unlock system for a vehicle 1 in FIG. 1, a common antenna is provided for the antenna to transmit the first request signal Rq1, and for the antenna to induce electromagnetic induction, and a common antenna is provided for the antenna to receive the first request signal Rq1, and for the antenna on which electromagnetic induction is induced. On the other hand, in a lock-unlock system for a vehicle 2 in FIG. 5, separate antennas are provided for the antenna to transmit the first request signal Rq1, and for the antenna to induce electromagnetic induction, respectively, and separate antennas are provided for the antenna to receive the first request signal Rq1, and for the antenna on which electromagnetic induction is induced, respectively.

The third antenna 23 in the lock-unlock system for a vehicle 2 includes a transmitter antenna 28 to transmit the first request signal Rq1 and a coil antenna 29 to induce electromagnetic induction. Also, the first antenna 42 includes a receiver antenna 46 to receive the first request signal Rq1 and a coil antenna 47 on which electromagnetic induction is induced.

Similar to the lock-unlock system for a vehicle 1, the lock-unlock system for a vehicle 2 executes the steps in FIG. 3, to make it easier for the user to recognize a timing to have the mobile device 40 approach the in-vehicle device 11. Also, similar to the lock-unlock system for a vehicle 1, the lock-unlock system for a vehicle 2 can prevent power consumption of the in-vehicle device 11 from increasing if the likelihood of the user being around the vehicle 10 is low.

In this way, according to the lock and unlock systems for a vehicle 1 and 2 described above, if a condition for switching from the first verification control to the second verification control is satisfied after the first verification control has been started, the indication unit 33 can indicate the switching from the first verification control to the second verification control, to the user around the vehicle 10. Therefore, if the control for verifying the identification code of the mobile device 40 is automatically switched from the first verification control to the second verification control, the user can recognize the switching, by the indication by the indication unit 33. Consequently, it is easy for the user to recognize a timing to have the mobile device 40 approach the in-vehicle device 11.

For example, if the timing to have the mobile device 40 approach the outside door handle 22 has been too early, for example, detaching a hand from the outside door handle 22 too early, it is possible to avoid that switching to the second verification control will not take place. In other words, it is possible to prevent locking or unlocking of the door 20 from failing even though having the mobile device 40 approach the in-vehicle device 11.

Conversely, if the timing to have the mobile device 40 approach the outside door handle 22 is too late, and the predetermined time at Step S110 in FIG. 3 has passed, it is possible to prevent locking or unlocking of the door 20 from failing even though having the mobile device 40 approach the in-vehicle device 11.

Also, the indication unit 33 of the lock and unlock systems for vehicles 1 and 2 includes the illumination unit 32 to indicate switching from the first verification control to the second verification control by change of light, and the illumination control unit 31 to control the change of light. Therefore, even if the vehicle 10 is stopped at a comparatively dark place, the user around the vehicle 10 can visually recognize switching from the first verification control to the second verification control, and hence, it is easy for the user to recognize a timing to have the mobile device 40 approach the in-vehicle device 11.

Also, the illumination control unit 31 of the lock and unlock systems for a vehicle 1 and 2, has the illumination unit 32 emit light in the first light emission aspect while the first verification control is being executed, and has the illumination unit 32 emit light in the second light emission aspect, which is different from the first light emission aspect, while the second verification control is being executed. Therefore, the user around the vehicle 10 can recognize that the first verification control is being executed by the first light emission aspect, and can recognize that the second verification control is being executed by the second light emission aspect. Further, by the change of the illumination unit 32 from the first light emission aspect to the second light emission aspect, the user around the vehicle 10 can visually recognize the switching from the first verification control to the second verification control. Therefore, it is easy for the user to recognize a timing to have the mobile device 40 approach the in-vehicle device 11.

Also, the illumination control unit 31 of the lock and unlock systems for a vehicle 1 and 2 may not have the illumination unit 32 emit light both while the first verification control is being executed, and while the second verification control is being executed, but may have the illumination unit 32 turn off light while the first verification control is being executed, and have the illumination unit 32 turn on light while the second verification control is being executed. In other words, the first indication control executes the second indication control without executing the first indication control in FIG. 4. According to this aspect, by having the illumination unit 32 change from a light-turned-off state to a light-turned-on state, the user around the vehicle 10 can visually recognize switching from the first verification control to the second verification control. Therefore, it is easy for the user to recognize a timing to have the mobile device 40 approach the in-vehicle device 11.

So far, the lock-unlock system for a vehicle has been described with the embodiments. Note that the present invention is not limited to the above embodiments. Various modifications and improvements can be made within the scope of the present invention, by combining and/or replacing a part of or all of the embodiments with the others.

For example, the illumination control unit 31 may have the illumination unit 32 turn on light while the first verification control is being executed, and have the illumination unit 32 turn off light while the second verification control is being executed. In other words, the first indication control executes the first indication control without executing the second indication control in FIG. 4. According to this aspect, by having the illumination unit 32 change from a light-turned-on state to a light-turned-off state, the user around the vehicle 10 can visually recognize switching from the first verification control to the second verification control. Therefore, it is easy for the user to recognize a timing to have the mobile device 40 approach the in-vehicle device 11.

Also, for example, at least one of the verification unit 14, the lock-unlock control unit 13, the reply determination unit 18, the detection determination unit 30, the command unit 17, and the illumination control unit 31 may be disposed in the door 20 (for example, in the outside door handle 22).

Also, for example, the illumination unit 32 may include another illumination unit such as a blinker and a room lamp, or may be replaced by the other illumination unit.

Also, for example, the illumination control unit 31 is not limited to change the color of light of the illumination unit 32, but may change the intensity of light or the blink interval of the illumination unit 32. For example, the illumination control unit 31 may change the intensity of light of the illumination unit 32 between the first light emission aspect and the second light emission aspect, or may change the blink interval of the illumination unit 32 between the first light emission aspect and the second light emission aspect.

Also, for example, the indication unit 33 is not limited to indicate switching from the first verification control to the second verification control by change of light, but may indicate the switching by change of sound or by change of vibration.

If aurally indicating the switching by change of sound (for example, change of the volume, the output interval of sound, the tone, etc.), the illumination unit 32 may be replaced by a loudspeaker unit that indicates the switching by change of sound, and the illumination control unit 31 may be replaced by a sound control unit that controls change of sound of the loudspeaker unit. For example, the sound control unit may change the volume of sound output from the loudspeaker unit between the period while the first verification control is being executed, and the period while the second verification control is being executed (for example, has the volume while the second verification control is being executed greater than the volume while the first verification control is being executed, to indicate an occurrence of the switching to the user more intensely). For example, the sound control unit may change the output interval of sound output from the loudspeaker unit between the period while the first verification control is being executed, and the period while the second verification control is being executed (for example, has the output interval of sound while the second verification control is being executed shorter than the output interval of sound while the first verification control is being executed, to indicate an occurrence of the switching to the user more intensely).

Also, if tactually indicating the switching by change of vibration (for example, change of the vibration amplitude, the generation interval of vibration, the vibration frequency, etc.), the illumination unit 32 may be replaced by a vibration unit that indicates the switching by change of vibration, and the illumination control unit 31 may be replaced by a vibration control unit that controls change of vibration of the vibration unit. For example, the vibration control unit may change the vibration amplitude generated by the vibration unit between the period while the first verification control is being executed, and the period while the second verification control is being executed (for example, has the vibration amplitude while the second verification control is being executed greater than the vibration amplitude while the first verification control is being executed, to indicate an occurrence of the switching to the user more intensely). For example, the vibration control unit may change the generation interval of vibration generated by the vibration unit between the period while the first verification control is being executed, and the period while the second verification control is being executed (for example, has the generation interval while the second verification control is being executed shorter than the generation interval while the first verification control is being executed, to indicate an occurrence of the switching to the user more intensely). For example, the vibration control unit may change the vibration frequency generated by the vibration unit between the period while the first verification control is being executed, and the period while the second verification control is being executed (for example, has the vibration frequency while the second verification control is being executed higher than the vibration frequency while the first verification control is being executed, to indicate an occurrence of the switching to the user more intensely).

Also, the indication unit 33 may indicate switching from the first verification control to the second verification control by any combination of light, sound, and vibration.

The present application is based on and claims the benefit of priority of Japanese Priority Application No. 2015-222474, filed on Nov. 12, 2015, the entire contents of which are hereby incorporated by reference.

The invention claimed is:

1. A lock-unlock system for a vehicle, comprising:

an in-vehicle device installed on the vehicle; and a mobile terminal that can be carried by a user, to execute locking or unlocking of a door of the vehicle by wireless communication between the in-vehicle device and the mobile terminal, wherein the mobile terminal includes a first communication control unit configured to return a reply of a first response signal that includes a first identification code of the mobile terminal, in response to receiving a first request signal transmitted from an antenna of the in-vehicle device, a second communication control unit configured to return a reply of a second response signal that includes a second identification code of the mobile terminal, in response to receiving power supplied by electromagnetic induction induced by a second request signal transmitted from the antenna of the in-vehicle device, wherein the in-vehicle device includes a first verification control unit configured to execute first verification control for verifying the first identification code, in a first wireless communication mode that transmits the first request signal, and receives the first response signal, a second verification control unit configured to execute second verification control for verifying the second identification code, in a second wireless communication mode having a shorter reachable communication range than the first wireless communication mode, that transmits the second request signal, and receives the second response signal, a lock-unlock control unit configured to execute locking or unlocking the door, based on a result of the verifying by the first verification control or the second verification control, a command unit configured to issue a command for switching from the first verification control to the second verification control, in a case where a condition for switching from the first verification control to the second verification control is satisfied after the first verification control has been started, and an indication unit configured to indicate the switching to the user carrying the mobile terminal.

2. The lock-unlock system for the vehicle as claimed in claim 1, wherein the indication unit includes an illumination unit configured to indicate the switching by change of light, and an illumination control unit configured to control the change of the light.

3. The lock-unlock system for the vehicle as claimed in claim 2, wherein the illumination control unit has the illumination unit emit light in a first light emission aspect while the first verification control is being executed, and has the illumination unit emit light in a second light emission aspect, which is different from the first light emission aspect, while the second verification control is being executed.

4. The lock-unlock system for the vehicle as claimed in claim 2, wherein the illumination control unit has the illumination unit turn off light while the first verification control is being executed, and has the illumination unit turn on light while the second verification control is being executed.

* * * * *